United States Patent [19]

Roland et al.

[11] 4,086,507

[45] Apr. 25, 1978

[54] OUTDOOR MOTOR ENCLOSURE

[75] Inventors: Murray C. Roland, Scottsbluff; Edward M. Norum, Gering, both of Nebr.

[73] Assignee: Lockwood Corporation, Gering, Nebr.

[21] Appl. No.: 714,185

[22] Filed: Aug. 13, 1976

Related U.S. Application Data

[63] Continuation of Ser. No. 546,510, Feb. 3, 1975, abandoned.

[51] Int. Cl.² .............................................. H02K 5/00
[52] U.S. Cl. ..................................................... 310/88
[58] Field of Search ....................... 310/85, 88, 89, 66, 310/157, 62, 63, 58

[56] References Cited

U.S. PATENT DOCUMENTS

| | | | |
|---|---|---|---|
| 2,422,824 | 6/1947 | Clauson et al. | 310/88 X |
| 3,053,390 | 9/1962 | Wood | 310/89 X |
| 3,512,024 | 5/1970 | Papa | 310/88 |
| 3,780,397 | 12/1973 | Harbeck et al. | 310/88 X |
| 3,815,172 | 6/1974 | Fromknect et al. | 310/88 X |

FOREIGN PATENT DOCUMENTS 1,243,950  8/1971  United Kingdom ................... 310/89

Primary Examiner—Mark O. Budd
Attorney, Agent, or Firm—Arnold, White & Durkee

[57] ABSTRACT

An enclosure is disclosed for use with motors in an outdoor environment. The enclosure serves to prevent moisture and dirt from contacting the motor housing or fan, thereby to prevent condensation inside the motor housing. The enclosure comprises a cylindrical moisture shield disposed about the motor housing to which is attached a rain canopy at one end thereof. An appropriate spacing is provided between the rain canopy and the moisture shield to permit air to be drawn inside of the enclosure to permit air cooling of the motor during operation.

7 Claims, 4 Drawing Figures

U.S. Patent  April 25, 1978  Sheet 1 of 2  4,086,507

OUTDOOR MOTOR ENCLOSURE

This is a continuation, of application Ser. No. 546,510, filed Feb. 3, 1975, now abandoned.

BACKGROUND OF THE INVENTION

This invention relates to electric motors which are utilized outdoors. More specifically, this invention relates to the use of electric motors out of doors where such motors will be operated intermittently over long periods of time without servicing or attention. A number of situations require the use of electric motors in outdoor environments, as for example, air-cooled house air conditioning units, electric lawn mowers and the like. One industrial application of an electric motor outdoors is for driving various irrigation devices on acreage under cultivation. A large number of irrigation devices exist which are operated by electric motors deployed in a field which are selectively operated during the growing season to irrigate the acreage. Generally such motors are used to drive the irrigation devices from a previous position to a new position in order to fully irrigate the acreage. Such motors, subjected to severe weather and dust conditions, are operated intermittently and receive very little care and attention between servicing intervals.

In order to obtain satisfactory service from such motors, it is necessary to protect them from the dust and moisture. It has been found that the motor housing which encloses the windings and drive shaft does not act as a sufficient moisture barrier. When a motor is operated for a period of time it warms up. If it is then shut off for a considerable length of time, any moisture such as rain, snow, etc., which contacts the motor housing causes condensation on the inside of the motor housing. This condensation will build up and collect in the bottom of the motor housing, causing ultimate and premature failure of the motor due to water in the windings.

An additional problem encountered, where only the housing is utilized to protect the motor, is that water will collect on top of the motor when not operating. Subsequent motor start-up, particularly where the motor is mounted vertically, will exert a slight negative pressure in the area of the drive shaft bearing directly beneath the motor cooling fan. This negative pressure is responsible for encouraging seepage of moisture between the bearing and shaft which ultimately collects inside the motor housing further aggravating the moisture problem.

Accordingly, in order to protect the motor for a substantial period of time, it is necessary to provide an enclosure in addition to the motor housing which not only prevents moisture from getting into the motor, but also keeps moisture from contacting the motor housing.

A constraint upon providing such an enclosure is that it is necessary that the motor be fan cooled during its period of operation, and accordingly an air flow into and out of the enclosure is necessary in order to prevent excessive heat buildup. A prior patent which has considered the problem and offered a solution thereto is U.S. Pat. No. 2,777,079. In this patent a horizontally mounted outdoor motor is disclosed which is maintained substantially weatherproof but which is ventilated by air circulation. This patent discloses a large housing structure wherein air is pulled in through a side housing and circulated directly through openings in the motor housing into the motor rotor and stator windings for cooling purposes. There is no concern with preventing moisture from contacting the motor housing nor is the design particularly desirable for smaller vertically mounted motors utilized for irrigation applications.

It is accordingly an object of the present invention to provide an outdoor motor enclosure for electric motors which will prevent moisture from impinging upon a motor housing while permitting adequate air cooling.

It is another object of the present invention to provide an outdoor motor enclosure which will prevent moisture from accumulating on the top of the motor housing between operating periods, whereby subsequent operation of the motor could cause such moisture to be drawn inside the motor housing.

It is another object of the present invention to provide a compact outdoor motor enclosure for protecting an electric motor which is vertically mounted with the cooling fan on the upper end thereof.

Other objects and advantages of the invention will be apparent from the concluding portion of the specification.

DETAILED DESCRIPTION

As has been mentioned in the background section of the specification, where electric motors are utilized out of doors for purposes such as operating irrigation equipment, it is necessary to protect the motors if a reasonable service period is to be obtained. One of the significant problems in utilizing electric motors in an outdoor environment is the requirement of essentially moisture proofing the motor. A typical electric motor will be encased in a housing which provides substantial moisture protection. However, as pointed out, when moisture is permitted to impinge upon the outer surface of the housing, particularly when the electric motor is intermittently operated, there is a tendency for condensation to form on the inside wall of the housing.

This condensation in time will build up and collect at the bottom of the motor causing ultimate and premature motor failure due to water in the windings. This is a primary concern of the present invention which is a motor enclosure the purpose of which is to prevent moisture from directly contacting the outer surface of the motor housing.

A secondary problem with motors which is solved by this enclosure is the accumulation of moisture on the top end of a motor which is vertically mounted. Water collecting at the shaft bearing tends to be sucked into the motor in small amounts each time the motor starts up. This moisture in time seeps down the vertical shaft and may cause premature bearing failure.

Figure 1:
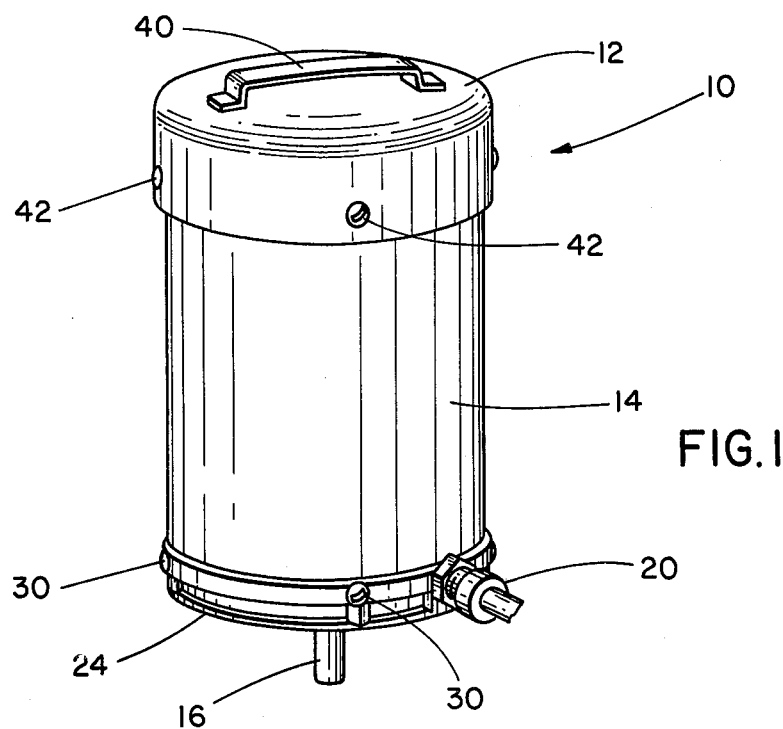
FIG. 1 is a perspective view of an electric motor encased within an outdoor motor enclosure according to a first embodiment of the invention.

Referring now to FIG. 1, an electric motor is illustrated in a vertical position. Mounted to the exterior of the motor housing is an outdoor motor enclosure 10, according to a preferred embodiment of the present invention. The enclosure 10 includes a rain canopy 12 and a cylindrical moisture shield 14. Extending vertically downward from the motor enclosure is the drive shaft 16. Electrical power to the motor, whether it be AC or DC, is provided through an electrical fitting 20 bolted to the motor housing through the moisture shield 14.

Figure 2:
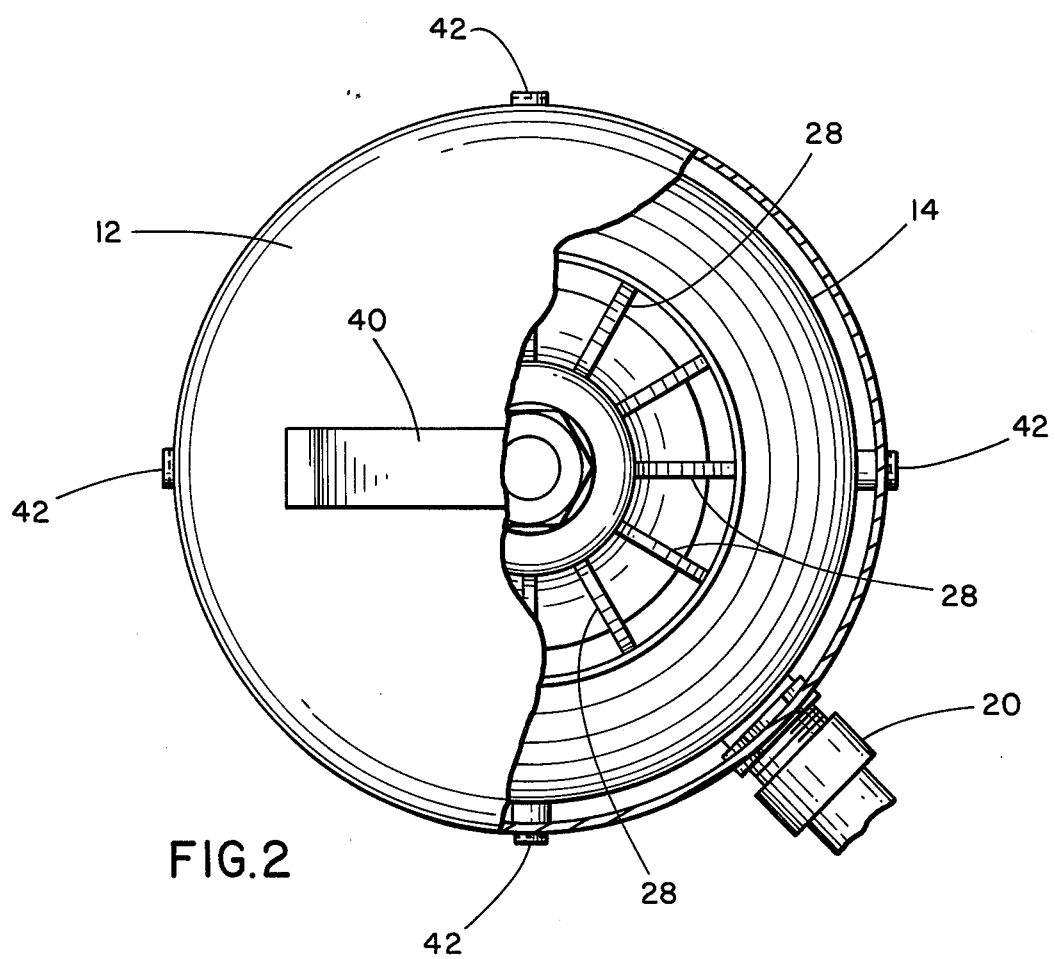
FIG. 2 is a plan view of the motor enclosure of FIG. 1 having a portion cut away to reveal the motor housing and cooling fan.
Figure 3:
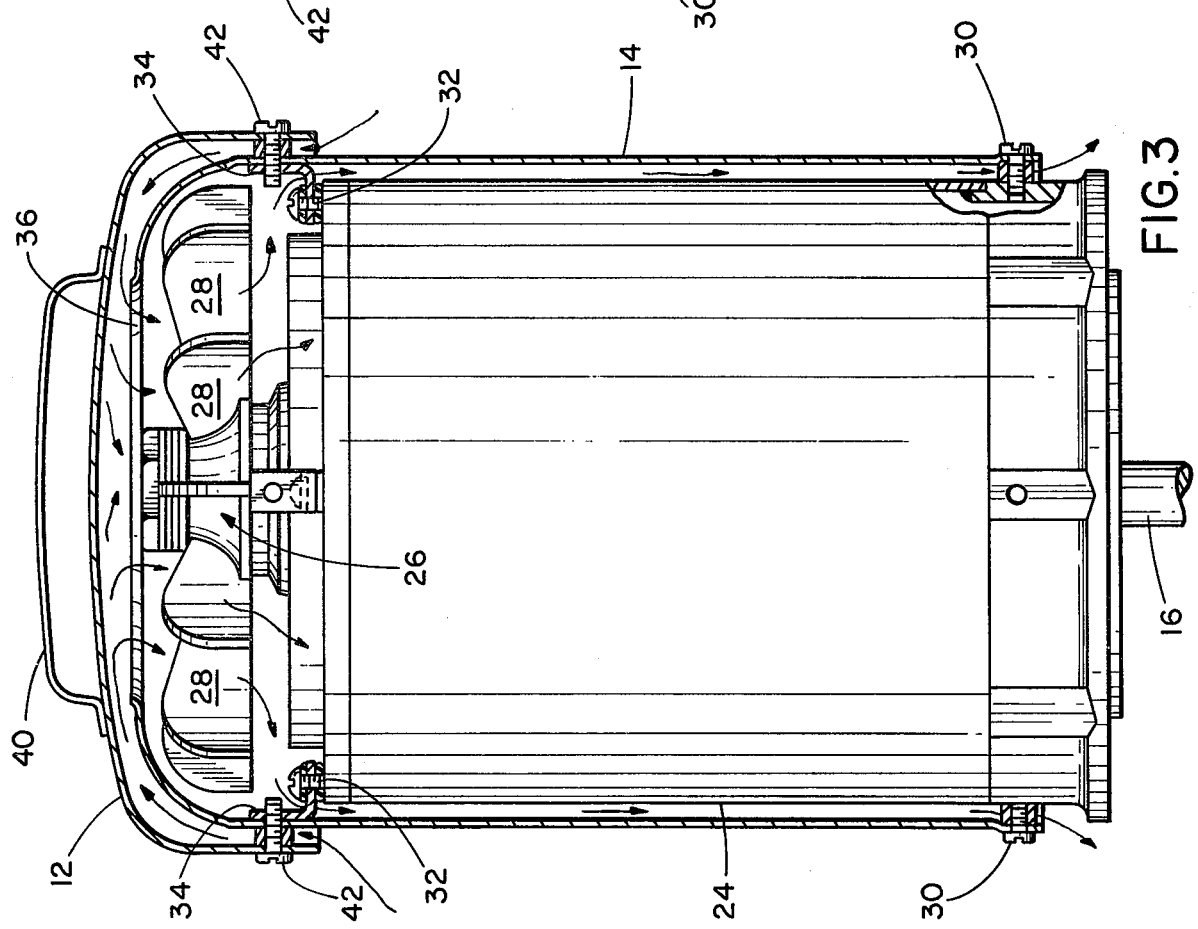
FIG. 3 is a side view with a portion of the moisture shield cut away illustrating the air flow into and out of the enclosure during operation of the cooling fan.

Referring now to FIGS. 2 and 3, the details of mounting the motor in the enclosure 10 may be understood. A motor is positioned vertically having its drive shaft 16 extending downwardly therefrom. The motor is encased in a housing 24 which, under other conditions would offer satisfactory protection in terms of electrical safety, normal dirt and humidity.

Extending vertically upward is the extension of the shaft 16 to which is attached a cooling fan 26 having a plurality of blades 28 thereon. As will be apparent to those skilled in the motor art, during operation of the motor 22, the fan 26 is rotated such that the blades 28 cause an air flow along the housing adequate to prevent overheating of the motor.

According to the present invention, an outdoor moisture protecting enclosure is provided on the housing of the motor which prevents moisture from contacting the motor housing but which freely permits air circulation to prevent overheating of the motor. As best illustrated in FIG. 3, the moisture shield 14 is mounted over the motor housing 24 and preferably secured thereto by bolts 30 at the lower end of the housing and bolts 32 at the upper end of the housing. An L bracket 34 may be attached to the shield 14 for this purpose.

It will be seen from FIG. 3 that the shield 14 is cylindrical in cross section, being open at its lower end. At its upper end the shield tapers to an opening of a diameter smaller than the motor housing at a point sufficiently above the housing to clear the fan blades 28. This opening has a slight, upwardly tapered edge 36 around its circumference. The diameter of the moisture shield 14 is chosen such that it exceeds the diameter of the motor housing 24 by an amount sufficient to provide adequate air space between the housing and the shield. What is considered adequate may be determined simply by the requirement that the air space must be sufficient so that the fan blades 28 can create a satisfactory air flow along the housing to maintain the motor at its proper operating temperature.

As will be apparent, air is drawn down through the opening 36 by the operation of the fan blades 28 and exhausted downwardly along the corridor between the moisture shield 14 and the motor housing 24 until it reaches the termination of the moisture shield where it reenters the outside environment. The moisture shield 14 thus prevents rain from directly contacting the side of the housing and, in fact, closes the housing off to attack by moisture at all locations save the top opening through which air is drawn in by the fan blades 28.

In order to complete the protection of the motor housing, the rain canopy 12 is provided. Canopy 12 has a handle 40 thereon for carrying the motor unit and for removing the rain canopy when it is desired to obtain access to the motor housing. The rain canopy fits over the upper end of the moisture shield 14 and is preferably secured thereto by bolts 42 spaced around the circumference of the canopy. As seen in FIG. 3, if desired, the bolts 42 can be utilized for securing the L brackets 34 to the moisture shield 14.

The rain canopy is larger in diameter than the housing and in fact than the moisture shield. Thus, when mounted as illustrated, a second air corridor is provided between the canopy 12 and the moisture shield 14 through which air can enter under suction from the fan blades 28. Thus, when the motor is operating, air enters under the rain canopy and passes upwardly to the opening 36 in the moisture shield 14. It is then drawn downwardly by the fan blades 28 along the corridor between the motor housing and the moisture shield effecting the necessary cooling of the motor.

As will be apparent, moisture cannot follow this course since an upward movement underneath the rain canopy is necessary to get into the proximity of the opening 36 of the moisture shield.

Figure 4:
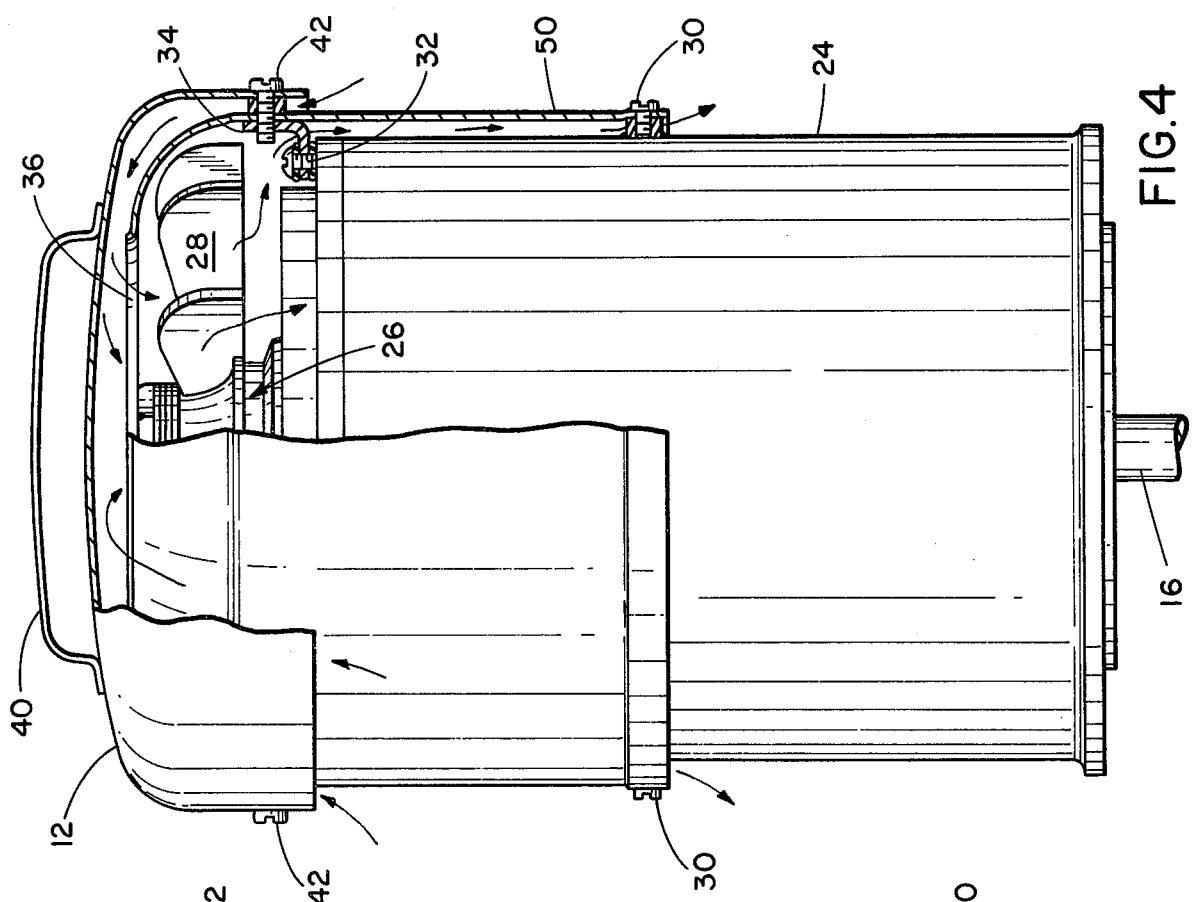
FIG. 4 is a side elevational view having portions cut away illustrating a second embodiment employing a partial moisture shield.

Referring now to FIG. 4, a modification is illustrated. In this embodiment the rain canopy 12 is identical with that illustrated in FIG. 3, however, the moisture shield 50 is provided over only an upper portion of the housing 24. Such a construction does not provide as complete protection against moisture as does the FIG. 3 embodiment; nevertheless, it does prevent rain from getting into the air intake of the fan and protects the upper portion of the motor housing against moisture. This construction will substantially reduce damage due to moisture on the housing and will prevent damage due to moisture seeping through the upper bearing seal. In those applications where complete moisture protection is not necessary, the modified form may be adequate. The modified or abbreviated moisture shield 50 is mounted to the motor housing 24 in a manner similar to that shown and described for FIG. 3.

While we have shown and described embodiments of this invention in some detail, it will be understood that this description and accompanying illustrations are offered merely by way of example, and that the invention is to be limited in scope only by the appended claims.

We claim:

1. An attachment to a vertically disposed, sealed electric motor unit of the outdoor type for protecting the motor unit from rain, said motor unit including a generally cylindrical housing surrounding a motor and further including a cooling fan mounted external to the housing for rotation with the drive shaft of the motor to thereby force a flow of cooling air along the outer surface of said housing, said attachment comprising:

a. a generally cylindrical moisture shield circumferentially disposed about said housing and said fan, said shield being of a cross-sectional dimension slightly greater than that of said housing to thereby define a first passage for said flow of cooling air, said shield having lower and upper end openings to define respectively exhaust and intake openings for said passage, the upper end opening being of a cross-section of a dimension reduced from that of said housing and being defined adjacent said cooling fan;

b. means for securing said shield directly to said housing wherein the housing is primarily the only support for said shield;

c. a rain canopy having a first portion circumscribing at least a portion of said shield and having a second portion disposed transversely of said drive shaft and slightly removed from said upper end opening for covering said upper end opening, said first and second portions being spaced from said shield to provide an air inlet passage to said upper end opening, whereby during operation of said motor unit the fan draws outside air upwardly through said air inlet passage, downwardly through said upper end opening, through said first passage, and through said lower end opening along said outer surface while protecting said motor unit from rain; and d. means for securing said canopy directly to said shield wherein the shield is primarily the only support for said canopy.

2. The device of claim 1 wherein said shield is attached to said motor housing and said rain canopy is attached to said shield.

3. The device of claim 1 wherein said shield substantially covers said motor housing.

4. The device of claim 1 wherein said shield covers only an upper portion of said motor housing.

5. The device of claim 1 wherein said canopy is bell shaped and spaced above said upper opening to require air to flow upwardly through said inlet to reach said upper opening thereby preventing rain from reaching said upper opening.

6. The device of claim 1 wherein said canopy has a handle formed thereon for facilitating carrying of said motor and removal of said canopy for access to said upper opening.

7. A rain-protected motor assembly comprising:

a. a vertically disposed, sealed electric motor unit of the outdoor type including a generally cylindrical housing surrounding a motor and a cooling fan mounted external to the housing for rotation with the drive shaft of the motor to thereby force a flow of cooling air along the outer surface of said housing;

b. a rain protecting attachment for the motor unit including i. a generally cylindrical moisture shield circumferentially disposed about said housing and said fan, said shield being of a cross-sectional dimension slightly greater than that of said housing to thereby define a first passage for said flow of cooling air, said shield having lower and upper end openings to define respectively exhaust and intake openings for said passage, the upper end opening being of a cross-section of a dimension reduced from that of said housing and being defined adjacent said cooling fan;

ii. means for securing said shield directly to said housing wherein the housing is primarily the only support for said shield;

iii. a rain canopy having a first portion circumscribing at least a portion of said shield and having a second portion disposed transversely of said drive shaft slightly removed from said upper end opening for covering said upper end opening, said first and second portions being spaced from said shield to provide an air inlet passage to said upper end opening, whereby during operation of said motor unit the fan draws outside air upwardly through said air inlet passage, downwardly through said upper end opening, through said first passage, and through said lower end opening along said outer surface while protecting said motor unit from rain; and iv. means for securing said canopy directly to said shield wherein the shield is primarily the only support for said canopy.

* * * * *